(12) United States Patent
Remo

(10) Patent No.: US 8,430,021 B2
(45) Date of Patent: Apr. 30, 2013

(54) GRINDING MEMBERS FOR A COFFEE-GRINDER DEVICE, AND COFFEE MACHINE COMPRISING SAID DEVICE

(75) Inventor: Gianni Remo, Pistoia (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 366 days.

(21) Appl. No.: 12/514,517

(22) PCT Filed: Nov. 7, 2007

(86) PCT No.: PCT/IT2007/000784
§ 371 (c)(1),
(2), (4) Date: May 12, 2009

(87) PCT Pub. No.: WO2008/059545
PCT Pub. Date: May 22, 2008

(65) Prior Publication Data
US 2010/0037778 A1    Feb. 18, 2010

(30) Foreign Application Priority Data

Nov. 14, 2006 (IT) ................ FI2006A0281

(51) Int. Cl.
*A23L 1/00* (2006.01)

(52) U.S. Cl.
USPC ............................... 99/286; 99/275

(58) Field of Classification Search ........... 99/348, 99/509–511, 275–315, 289 R; 241/168, 241/169.1, 100, 101.2, DIG. 27
See application file for complete search history.

(56) References Cited

U.S. PATENT DOCUMENTS

| | | | |
|---|---|---|---|
| 2,970,783 A * | 2/1961 | Cheyette | 241/300 |
| 3,977,612 A * | 8/1976 | Brown et al. | 241/254 |
| 4,203,558 A | 5/1980 | Schnitzer | |
| 4,502,643 A * | 3/1985 | Burggrabe | 241/257.1 |
| 5,518,190 A | 5/1996 | Aebi et al. | |
| 5,868,330 A * | 2/1999 | Dodd et al. | 241/296 |
| 7,273,005 B2 * | 9/2007 | Turi | 99/286 |
| 2005/0279219 A1 | 12/2005 | Turi | |

FOREIGN PATENT DOCUMENTS

| | | |
|---|---|---|
| DE | 85 33 929.6 | 5/1986 |
| DE | 195 14 794 | 10/1996 |
| EP | 1 065 962 | 11/2001 |
| EP | 1 493 368 | 10/2005 |
| WO | WO 96/23437 | 8/1996 |

* cited by examiner

*Primary Examiner* — William Pierce

(57) ABSTRACT

A grinding member for a device for grinding coffee includes a grinder with a grinding surface. A single co-molded block is formed including the grinding member with a support made of plastic material.

26 Claims, 8 Drawing Sheets

GRINDING MEMBERS FOR A COFFEE-GRINDER DEVICE, AND COFFEE MACHINE COMPRISING SAID DEVICE

TECHNICAL FIELD

The present invention relates to improvements to devices for grinding coffee beans, in particular designed for machines for making coffee, both for domestic and professional use and for use as automatic distributors of beverages.

STATE OF THE ART

In some machines for making coffee, especially espresso coffee, a grinding device is provided that grinds a given amount of coffee beans at the moment when the supply of the beverage is required. Grinding devices typically comprise two grinding members, each having a grinder, i.e., an element provided with an active surface provided with teeth of appropriate shape. The teeth of the two opposed grinders, which present a relative rotary motion, pulverize the coffee beans that are fed into the space defined between the two opposed active surfaces of the grinders. In some cases, these elements are defined as "grinder" and "counter-grinder", the first being typically rotating and the second typically fixed. In the context of the present description and attached claims, on the other hand, the term "grinder" designates in a broad sense a member having an active grinding surface, irrespective of whether it is fixed or rotating.

An example of coffee-grinding device designed for use in machines of this type is described in U.S. Pat. No. 5,518,190. In this device a first grinder comprises a conical body rotating about its own axis, inserted within a second grinder or fixed counter-grinder, which has two conical surfaces with opposed inclinations.

Described in EP-A-1,065,962 is a different device for grinding coffee beans, particularly designed for machines for making espresso coffee. In this device two grinders are envisaged, one fixed and the other rotating, formed by two substantially disk-like elements, with toothed grinding surfaces with substantially conical development.

In US-A-2005/0279219 and in EP-A-1,493,368 a grinding device is described comprising two grinding members, each of which comprises a grinding body (mobile grinder and fixed grinder, or grinder and counter-grinder) of disk-like or annular shape, on which the grinding toothings are provided. The two members are set opposed to one another, and the coffee in the form of beans is fed into the space between said grinding members to be broken down and reduced to powder.

In general, the grinders, whether they are made of ceramic or metal material, are fixed on supports made of plastic material, which are in turn constrained to fixed parts of the machine or else to rotation members. In general, one of the two grinders will be carried by a support rotating by means of a motor reducer, whilst the other grinder is normally carried by a support that can be adjusted by the user to modify the distance between the grinders and thus increase or decrease the dimensions of the granules of the ground product. The distance between the grinders must be fixed with extreme precision, since the quality of the beverage that is obtained via infusion of the coffee depends upon the dimensions of the granules of the ground coffee.

On the other hand, the production and assembly of the components of a grinding device must be simple and inexpensive operations. This requirement is clearly in contrast with that of having high precision of assembly, upon which the precision of the mutual positioning of grinder and counter-grinder depends.

U.S. Pat. No. 4,203,558 discloses a household cereal mill including a manually rotating grinder and a stationary grinder. The stationary grinder has a rear cavity in which an insert of metal or plastic is cast into a cavity of the stationary grinder.

WO-A-9623437 discloses a coffee brewing apparatus including a grinding shaft supporting a grinding blade. The grinding shaft is connected to the grinding blade by a housing. The grinding shaft, the housing and the grinding blade are formed by an insert molding method. This method allows for the grinding shaft made of metal and the stainless steel blade to be secured by a mold, thus allowing a plastic material forming the housing to be injected around the shaft and the center portion of the blade.

OBJECTS AND SUMMARY OF THE INVENTION

According to a particular aspect, an object of the present invention is to provide a grinding member for a device for grinding coffee beans that will overcome either totally or in part the problems highlighted above.

According to a further aspect of one embodiment, a purpose of the present invention is to provide a grinding member that is easy and economical to produce and easy and simple to assemble, but that at the same time will enable limited tolerances and hence high precision of assembly to be obtained to guarantee a good quality of the ground coffee.

According to a further aspect, the invention relates to a grinding device that comprises grinding members that are easy and economically advantageous to produce and simple to assemble and will enable a high dimensional precision.

According to yet a further aspect, the purpose of the present invention is to provide an economically advantageous method for the production of grinding members, in particular for grinding coffee beans, with high dimensional precision.

In one embodiment, the invention envisages a grinding member comprising a grinder with a grinding surface, forming a single co-molded block with a support made of plastic material embracing the grinder. Substantially, the invention is based upon the idea of producing via the co-molding technique a single block constituted by the plastic support and by the body of the grinder proper, on which the grinding toothings are provided. The grinder can be made of ceramic material, of metal, or of any material of suitable strength and compatibility with foodstuff products.

In order to guarantee an effective and secure anchoring between the plastic material and the insert made of metal, ceramic or some other material, forming the body of the grinder, according to an advantageous embodiment of the invention, the body of the grinder comprises a plurality of anchoring projections, or else a plurality of undercuts, which can also be obtained, for example, via holes, depressions, or lowered areas made in the body of the grinder. The type of configurations of the means of stable anchoring between the body of the grinder and the block made of plastic material forming the support depend also upon the material with which the body of the grinder is made.

In a particularly advantageous embodiment of the invention, the grinder has a substantially disk-like shape with a front toothing. The grinding members are arranged in the grinding device in such a way as to present the surfaces of grinding of the grinders with the respective toothings opposed to one another. In this case, the use of the technique of co-molding for the production of the block comprising the grinder and the support made of plastic material, on the other hand, enables particular advantages to be achieved in so far as it is possible to control and guarantee directly in the step of production by co-molding the parallelism between the plane of the grinder, i.e., the plane of the grinding surface, and the thrust bearing provided in the grinding device.

In some embodiments the plastic material forms, in addition to the support for the grinder, also a mechanical transmission element, such as the toothing for adjusting the distance between two grinders of a grinding unit, or else the driven shaft which receives the motion from the motor of the grinder and drives the grinding member into rotation.

Further advantageous features and embodiments of the invention will be described in what follows with reference to an example of embodiment and are set forth in the attached claims.

According to a different aspect, the invention relates to a method for the production via co-molding of a grinding member, for example a grinder or counter-grinder, for a device for grinding coffee beans.

BRIEF DESCRIPTION OF THE DRAWINGS

A better understanding of the invention will emerge from the ensuing description and the attached drawings, which show a practical non-limiting embodiment of the invention. More in particular, in the drawings.

DETAILED DESCRIPTION OF AN EMBODIMENT OF THE INVENTION

Figure 1:
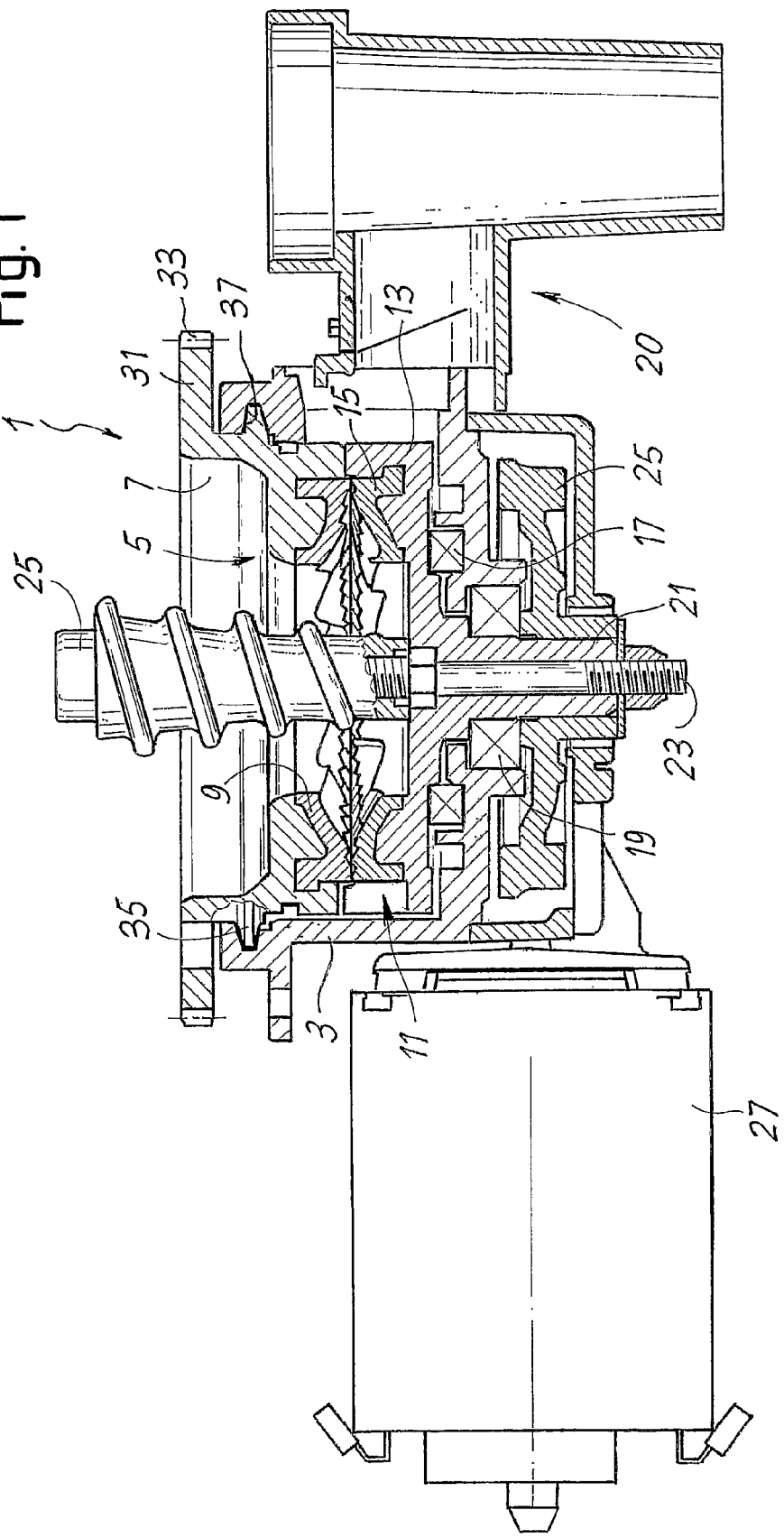
FIG. 1 is an axial cross section of a grinding device with plane grinders.

Illustrated in FIG. 1, and as a whole designated by 1, is a grinding device that comprises grinding members made according to the invention.

In broad outline, in the example illustrated the grinding device 1 is substantially made as described US-A-2005/0279219. This is a grinding device with disk-like plane grinders. The device 1 comprises a housing or seat 3 substantially fixed on a supporting structure (not illustrated) of the machine, in which a first grinding member 5 is set, the structure of which will be described in greater detail in what follows with reference to FIGS. 2 and 3. The grinding member 5 comprises a support 7 and a disk-like grinding body or grinder 9 made of ceramic or metal material.

Figure 4:
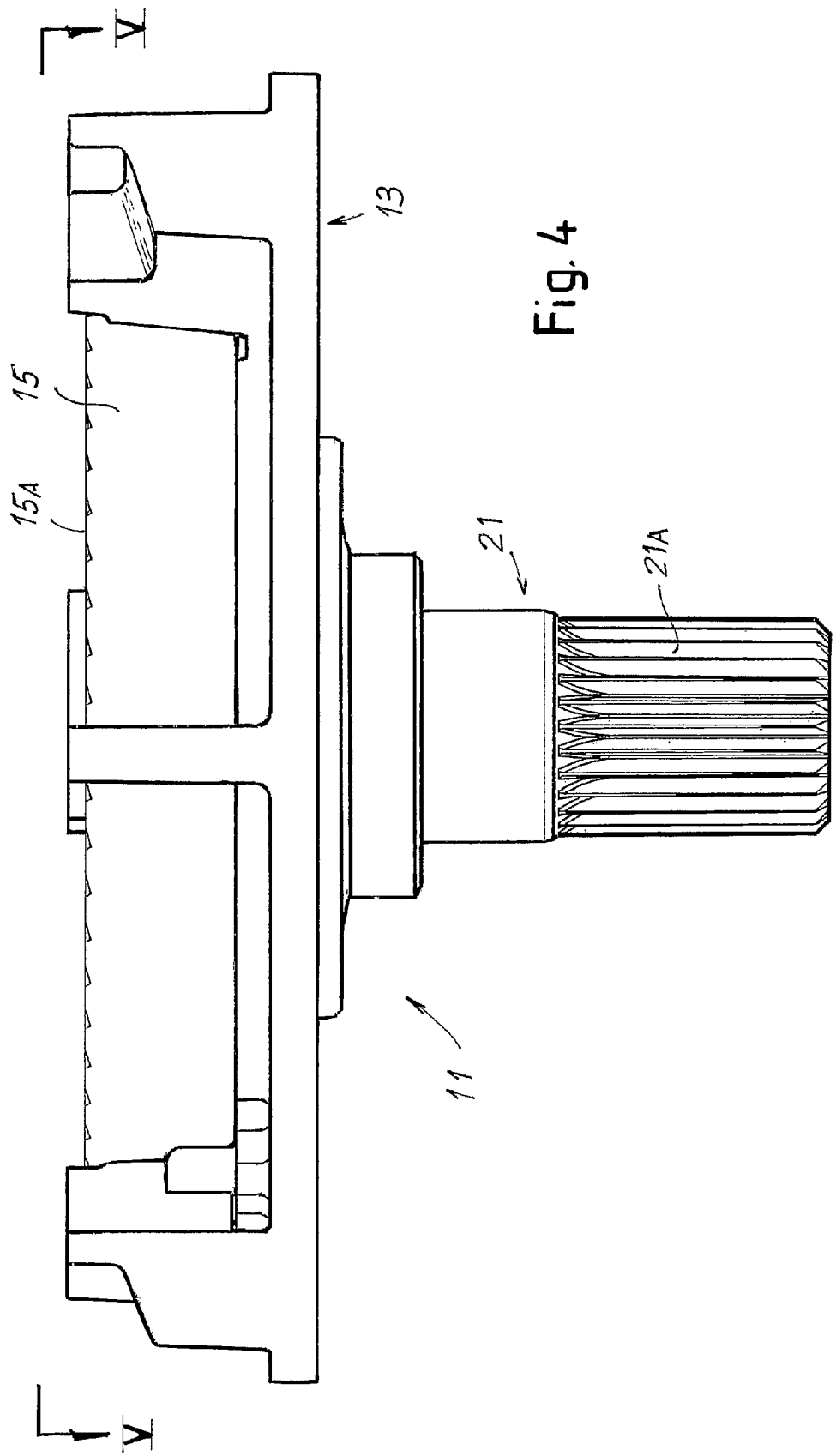
FIG. 4 is a side view of the rotating bottom grinding member.
Figure 5:
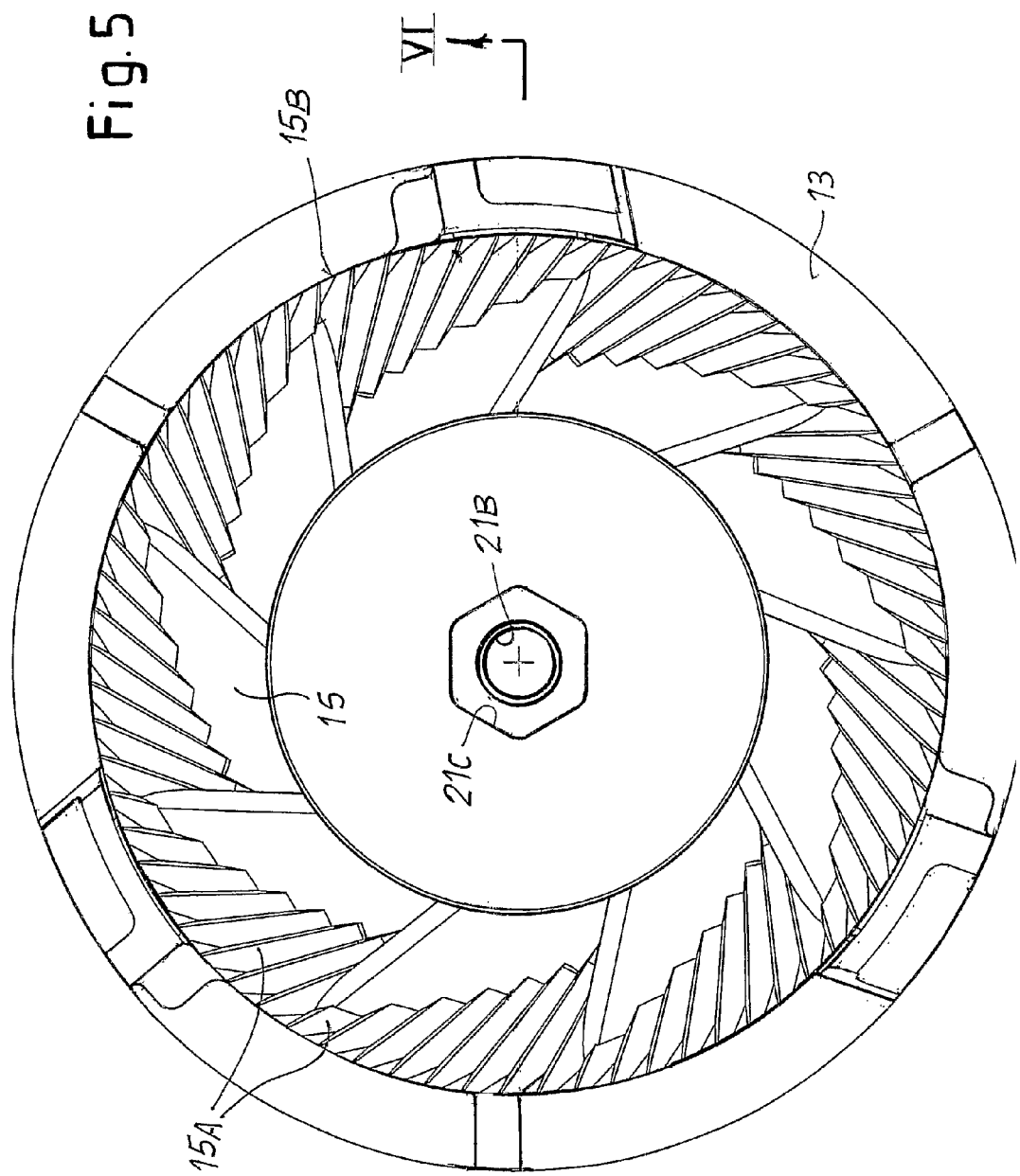
FIG. 5 is a plan view according to V-V of FIG. 4.
Figure 6:
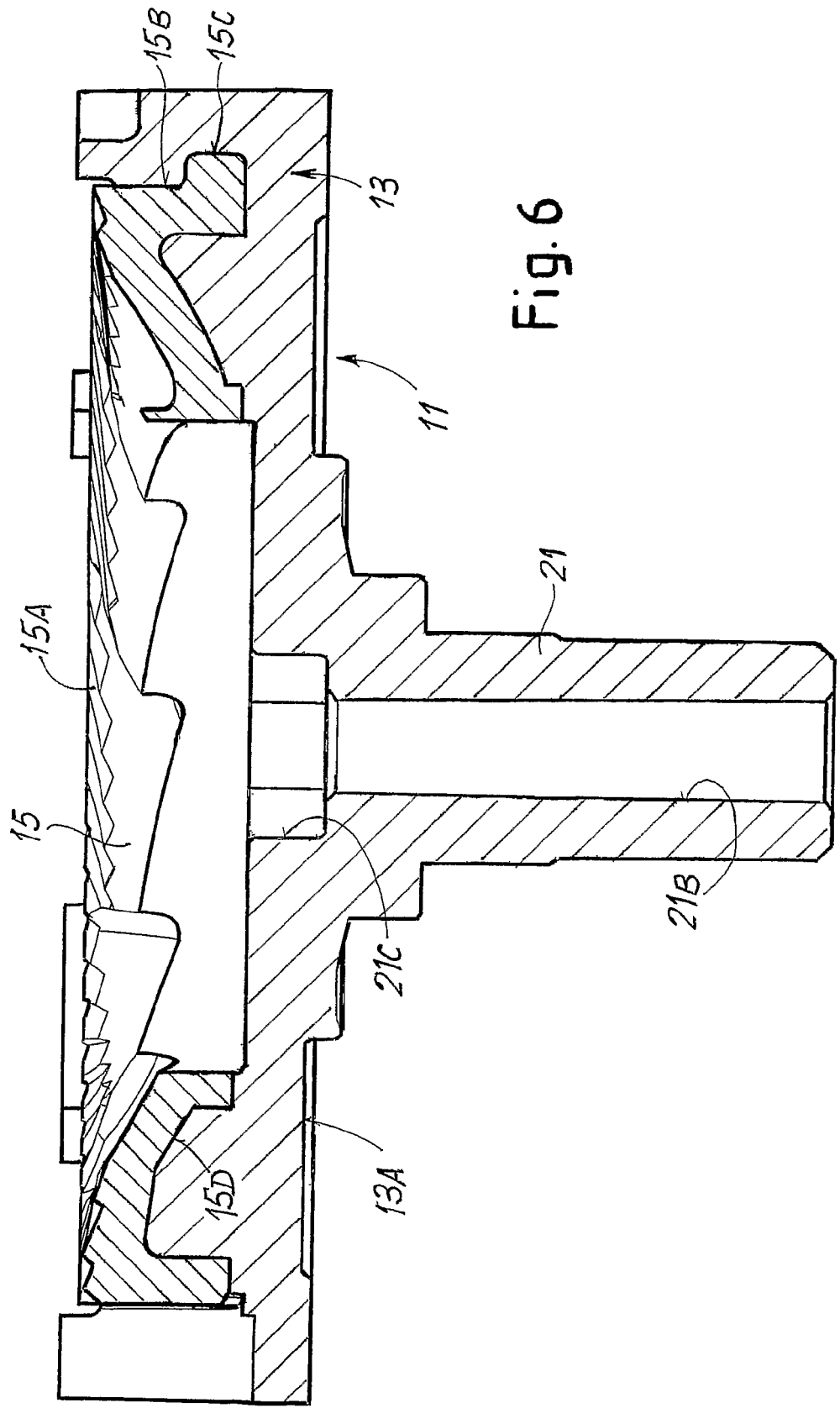
FIG. 6 is a cross section according to VI-VI of FIG. 5.

Also housed in the seat 3 is a second grinding member 11, the structure of which will be described in greater detail in what follows, with specific reference to FIGS. 4, 5 and 6. It comprises a support 13 made of plastic material and a disk-like grinding body or grinder 15 made of ceramic or metal material.

The grinding member 11 is supported in the seat 3 via a thrust bearing 17 and a radial bearing 19. The support 13 of the grinding member 11 has a shank 21, made on which is the seat for the inner ring of the bearing 19, which is hollow to enable passage of a spindle 23, on which an auger 25 is fixed, which projects through the empty space between the two grinders 9 and 15 upwards, within a hopper (not shown), in which the coffee is contained in the form of beans that are to be gradually fed to the grinding members 5 and 11 to be reduced to powder. The shank 21 has an external spline, visible in particular in FIG. 4 and designated therein by 21A, forming part of a splined coupling between the shank 21 and a gear 25, which receives its motion from an electric motor 27 via a screw (not illustrated) meshing with the toothing of the gear 25.

Provided between shank 21 and spindle 23 coaxial thereto is a torsional coupling that can be obtained, for example, with a splined profile, with a non-circular cross section of the spindle 23 and of the axial hole (or of parts thereof) of the shank 21 or in some other suitable way.

Designated moreover as a whole by 20 in FIG. 1 is the discharge of the coffee powder to an infusion unit of a type in itself known and not shown.

Figure 2:
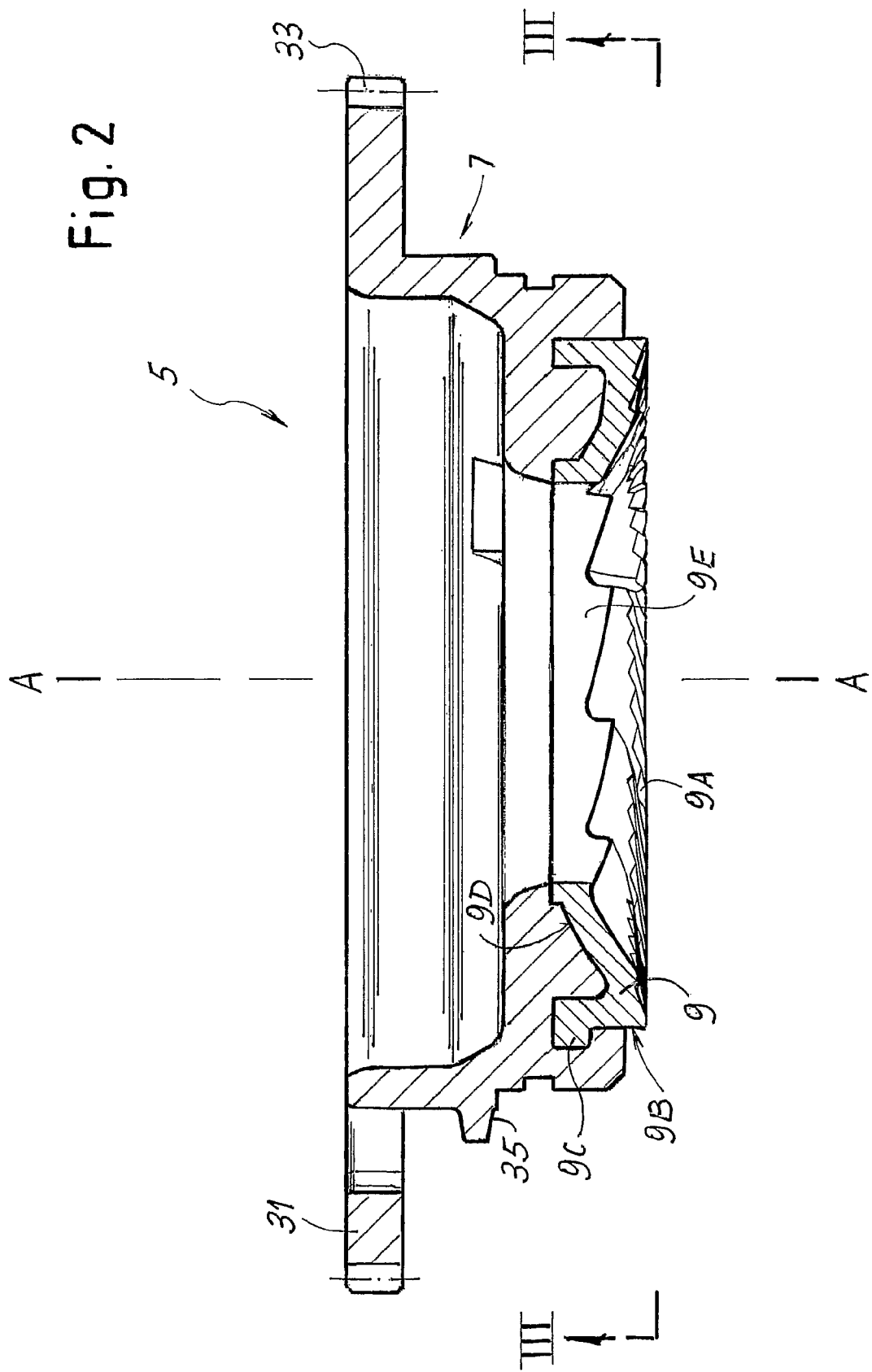
FIG. 2 is an axial cross section of the top fixed grinding member.
Figure 3:
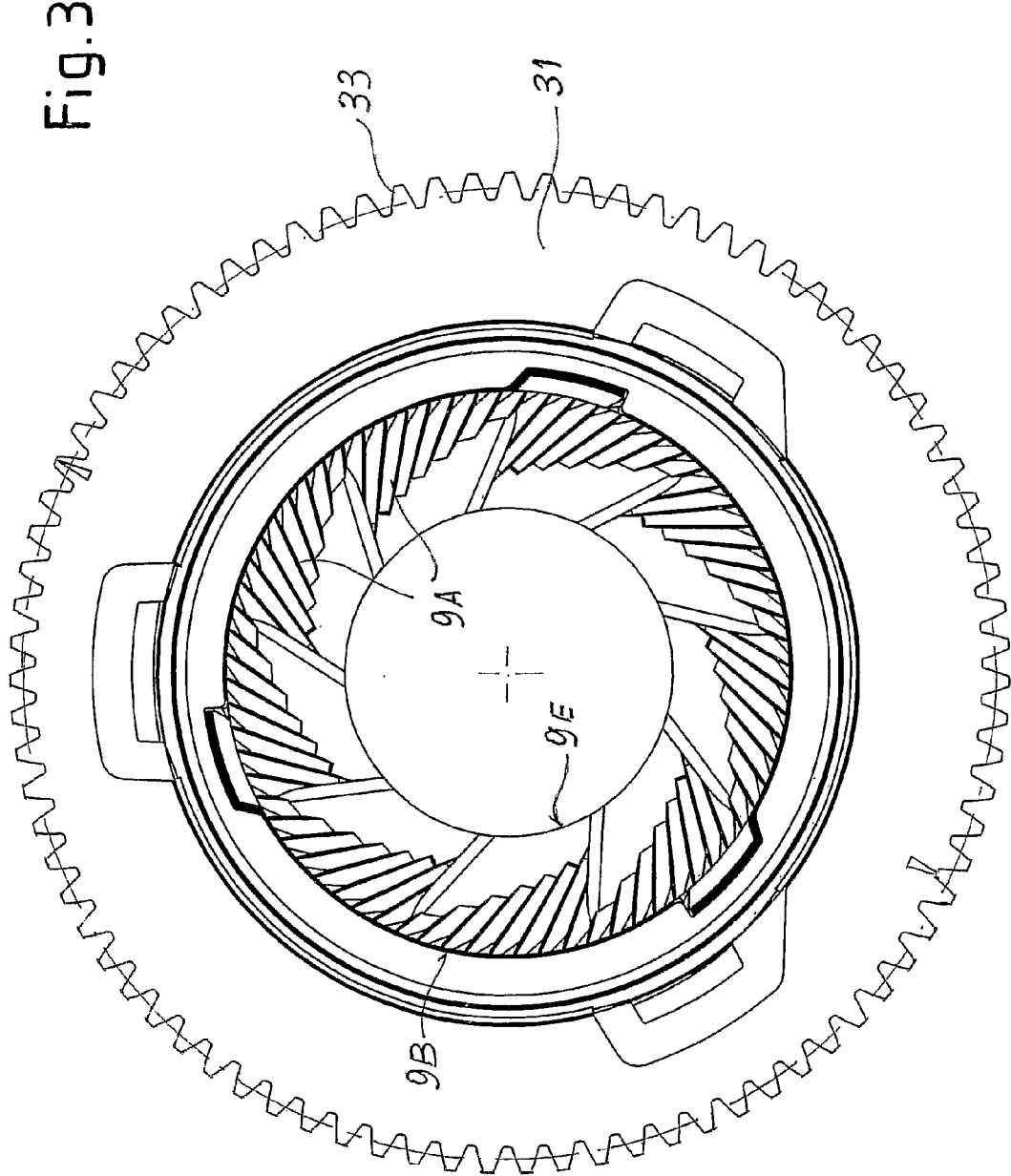
FIG. 3 is a view according to III-III of the grinding member of FIG. 2.

With reference to FIGS. 2 and 3, the structure of the top grinding member 5 will now be described in greater detail. Said top grinding member 5 has a flange 31, on which there is provided a toothing 33 meshing with a pinion wheel of a device for adjusting the distance between the grinding members 5 and 11. Adjustment is obtained in a known way by imparting a rotation on the member 5 about its axis A-A. Provided on the support 7 made of plastic material of the grinding member 5 is a thread 35, which engages in a corresponding thread 37 made in the seat 3 so that a rotation through a small angle of the grinding member 5 about its own axis causes a displacement thereof along the axis A-A, in order to cause a mutual approach or recession of the grinders 9 and 15 of the grinding members 5 and 11.

It may be noted, in particular in FIG. 2, that the grinder 9, which is advantageously made of sintered ceramic material but can also be alternatively made of metal, and on the front surface of which (visible in FIG. 3) the toothing 9A for grinding is provided, is englobed in the mass of plastic material forming the support 7. The grinder 9 has a substantially cylindrical side surface 9B, embraced by the plastic material forming the. support 7, and made along said cylindrical side surface 9B are projections 9C that form undercuts, about which the plastic material 7 is made to solidify in the co-molding step. The plastic material forming the support 7 adheres intimately not only to the surface 9B and to the projections 9C forming undercuts, but also to the rear surface 9D of the body of the grinder 9. In addition to the front surface on which the toothings 9A are provided, also the internal cylindrical surface 9E of the body of the grinder 9 remains free, defining the passage for entry of the coffee beans.

Figure 7:
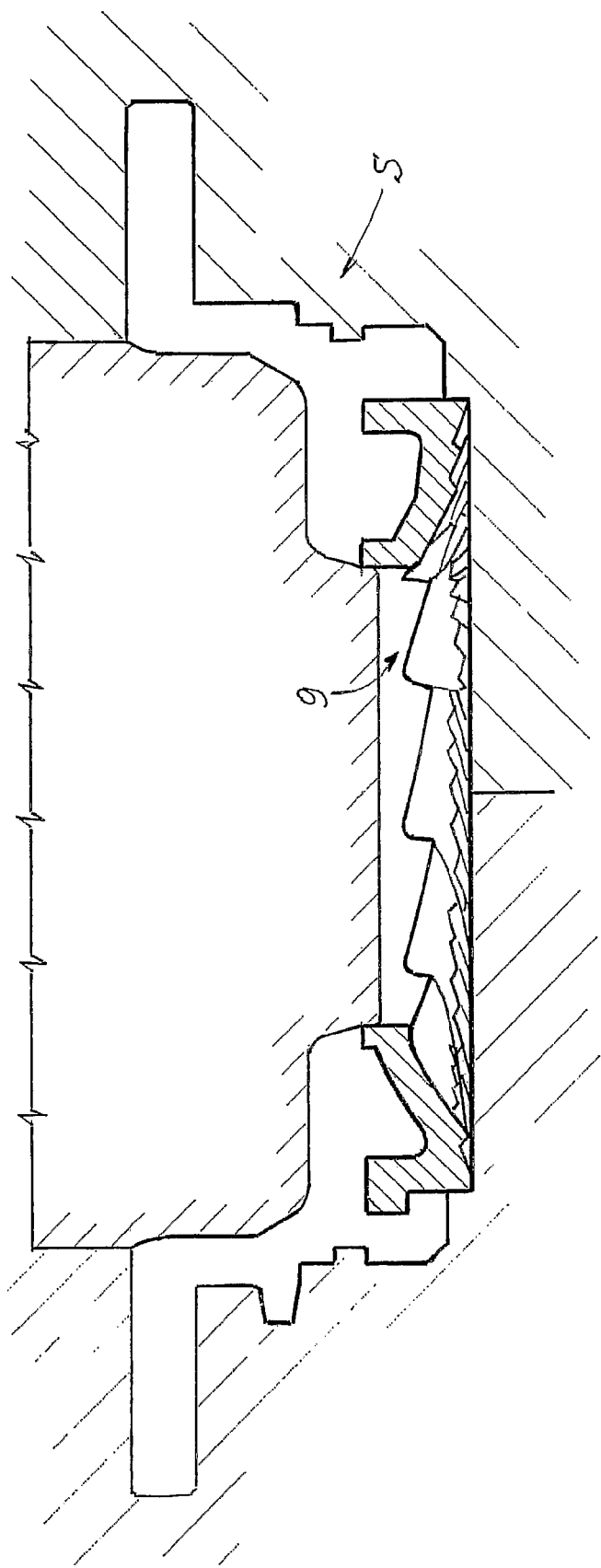
FIG. 7 is a diagram illustrating the method of fabrication of a grinding member according to the invention.

Coupling between the support made of plastic material 7 and the body of the grinder 9 is obtained by co-molding, by inserting the body of the grinder 9, previously formed (for example, by sintering of a ceramic material, by chip removal machining starting from a metal block, or in some other suitable way) within a die, which in FIG. 7 is outlined very schematically and designated by S. The die is subsequently closed so as to define the space that will be filled with the molten plastic material that is to form the support 7.

The active surface on which the grinding toothings 9A are made and possibly the internal cylindrical surface 9E of the body of the grinder 9 can be appropriately protected during the co-molding step.

By co-molding the support made of plastic material 7 on the body of the grinder 9 a stable and long-lasting intimate coupling is obtained between the two components, without any need to proceed to their assembly, as occurs currently with grinders of a known type, which require a manual assembly of the grinder 9 on the plastic support. It should be noted that, whilst assembly of the grinder 9 on the support 7 in traditional systems is carried out manually, insertion of the grinder 9 pre-formed within the die, in which the plastic material for the formation of the support 7 will be injected, can be easily automated, so that in practice a substantial economy due to the saving of labor for the assembly of the grinding device 1 is obtained.

Furthermore, co-molding guarantees a high dimensional precision and in particular reduced tolerances as regards the position of the plane of grinding (understood as the plane tangential to the active surface 9A of the grinding body 9) and the other parts (in particular, the thread 35) of the support 7, which define the position of the grinding member 5 in the seat 3 in which the latter is mounted. All this results in a high grinding quality.

The grinder 9 presents a high stiffness thanks to the type of material with which it is formed and to its relatively thick cross section. The coupling by co-molding between the rigid body of the grinder 9 and the support made of plastic material 7 guarantees a high shape stability to the support 7 made of plastic material, obtained thanks to the intimate coupling between the two components 9 and 7, which, instead, cannot be guaranteed by the traditional mechanical coupling between the grinder and the support of traditional grinding members.

The same advantages mentioned above are found in manufacturing by co-molding the bottom grinding member 11, the structure of which will now be described in greater detail with reference to FIGS. 4 to 6.

The bottom grinding member 11 comprises, as mentioned previously, a support made of plastic material 13, englobed in which by co-molding is the body of the grinder 15, the active surface of which, equipped with the grinding toothings, is designated by 15A. The surface 15A is opposed to the surface 9A of the top grinder 9. Also the grinder 15 has a substantially cylindrical side surface designated by 15B, along the development of which undercuts 15C are made so that the plastic material forming the support 13 comes to embrace and surround intimately at least part of the cylindrical surface 15B fitting around the undercuts 15C to obtain a stable and long-lasting mutual anchoring between the body of the grinder 15 and the support 13. Finally, designated by 15D is the rear surface of the body of the grinder 15, with which the plastic material forming the support 13 again comes into intimate contact.

Also the shank 21 is made in the co-molding step via the same plastic material that forms the disk-like portion of the support 13 surrounding the grinding body 15. In FIG. 6 also the through hole 21B, through which the spindle 23 is inserted and made to pass, is illustrated in detail. Designated by 21C is a seat, for example hexagonal in shape, in which a portion of the spindle 23 having a corresponding shape engages to obtain a torsional coupling between the support 13 and the spindle itself.

Manufacturing the bottom grinding member 11 by co-molding technique enables advantages to be obtained similar to the ones referred to above with reference to the top grinding member 5. Furthermore, in this case a further advantage is achieved in terms of dimensional precision, as regards the parallelism between the plane of grinding (understood as a plane tangential to the surface 15A) and the rear plane surface 13A (FIG. 6) of the support 13, in a position corresponding to which the grinding member 11 rests on the thrust bearing 17.

The co-molding process of the bottom grinding member 11 is similar to what was schematically illustrated previously for the top grinding member 5: the body of the grinder 15 is inserted in the die, after prior protection of the surface 15A if required, the die is closed, and then the molten plastic material is injected, which, by solidifying, forms the support 13 that embraces intimately the surfaces of the body of the grinder 15.

Figure 8:
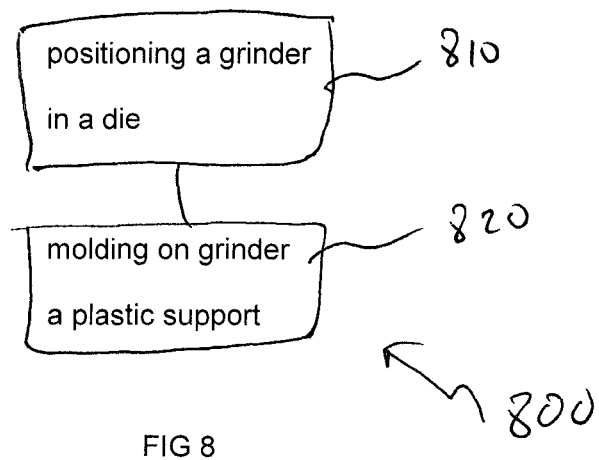
FIGS. 8-9 show process operations according to an embodiment.
Figure 9:
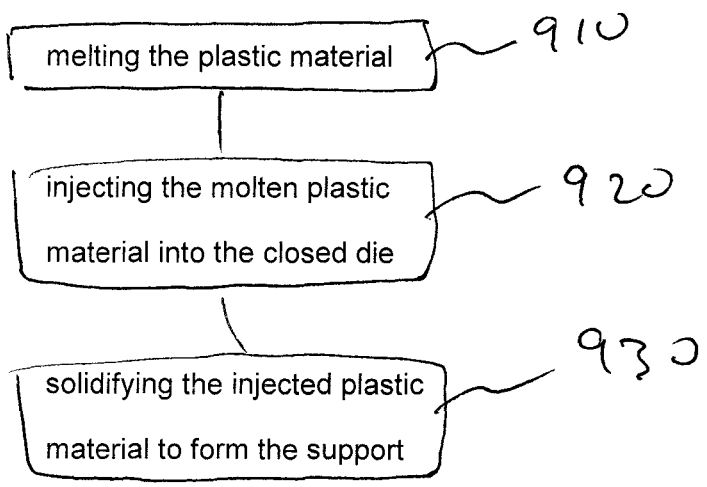

FIG. 8 shows method operations 800 according to an embodiment that includes positioning a grinder in a die 810 and molding on grinder a plastic support 820. As shown in FIG. 9, the molding act 820 includes the acts of melting the plastic material 910; injecting the molten plastic material into the closed die 920; and solidifying the injected plastic material to form the support 930.

It is understood that the drawing shows just one example, provided merely as a practical embodiment of the invention, which can vary in the forms and arrangement, without on the other hand departing from the scope of the idea underlying the invention. The possible presence of reference numbers in the annexed claims merely has the purpose of facilitating reading of the claims with reference to the description and to the drawings, and in no way limits the scope of protection represented by the claims.

The invention claimed is:

1. A grinding member for a coffee grinding device comprising:
    a seat having seat threads;
    a top grinder set in the seat, the top grinder having a top grinding surface, a rear surface opposite the grinding surface, and a side surface between the rear surface and the grinding surface;
    a support made of plastic material, wherein said top grinder is laterally embraced by said plastic material forming said support, and wherein said plastic material is fixedly bound to the rear surface and the side surface of the top grinder, the support including support threads; and
    a bottom grinder having a bottom grinding surface facing the top grinding surface,
    wherein the seat threads cooperate with the support threads for adjusting a distance between the top grinder and the bottom grinder in response to rotation of the top grinder.

2. The grinding member according to claim 1, wherein the top grinder is coated laterally and on said rear surface with said plastic material forming said support.

3. The grinding member according to claim 1, wherein said top grinder and said plastic material are intimately connected by shape coupling.

4. The grinding member according to claim 1, wherein said top grinder is made of ceramic material.

5. The grinding member according to claim 1, wherein said top grinder is made of metal.

6. The grinding member according to claim 1, wherein said top grinder has a plurality of anchoring projections embedded in the plastic material of said support.

7. The grinding member according to claim 1, wherein said top grinder comprises anchoring undercuts to which said plastic material forming the support adheres intimately.

8. The grinding member according to claim 1, wherein said top grinder has a front toothing.

9. The grinding member according to claim 1, wherein said mechanical transmission member further comprises a shaft for driving the grinding member.

10. The grinding member according to claim 9, wherein said shaft is co-axial to said top grinder and extends from the rear surface opposite to the grinding surface.

11. A grinding device for grinding coffee beans, comprising at least one grinding member, said at least one grinding member comprising:
   a seat having seat threads;
   a top grinder set in the seat, the top grinder having a top grinding surface, a rear surface opposite the grinding surface, and a side surface between the rear surface and the grinding surface;
   a support made of plastic material, wherein said top grinder is laterally embraced by said plastic material forming said support, and wherein said plastic material is fixedly bound to the rear surface and the side surface of the top grinder, the support including support threads; and
   a bottom grinder having a bottom grinding surface facing the top grinding surface,
   wherein the seat threads cooperate with the support threads for adjusting a distance between the top grinder and the bottom grinder in response to rotation of the top grinder.

12. A coffee machine comprising a device for grinding coffee beans, the coffee machine comprising:
   a seat having seat threads;
   a first grinding member; and
   a second grinding member, wherein the first and second grinding members co-operate with one another, wherein at least one of said first and second grinding members comprises a top grinder set in the seat, the top grinder having a grinding surface, a rear surface opposite the grinding surface and a side surface between the rear surface and the grinding surface;
   a support made of plastic material, wherein said top grinder is laterally embraced by said plastic material forming said support, and wherein said plastic material is fixedly bound to the rear surface and the side surface of the top grinder, the support including support threads; and
   a bottom grinder having a bottom grinding surface facing the top grinding surface,
   wherein the seat threads cooperate with the support threads for adjusting a distance between the top grinder and the bottom grinder in response to rotation of the top grinder.

13. A method for the production of a grinding member for a grinding device, the method comprising the act of:
   positioning a top grinder in a die, wherein the top grinder has a grinding surface, a rear surface opposite the grinding surface, and a side surface between the rear surface and the grinding surface;
   molding on said top grinder a support made of plastic material, the plastic material forming a single body with said top grinder and laterally embracing said top grinder to form an intimate coupling between said top grinder and said support, wherein said plastic material is fixedly bound to rear surface and the side surface of the top grinder, the support including support threads; and
   forming a bottom grinder having a bottom grinding surface facing the top grinding surface,
   wherein the seat threads cooperate with the support threads for adjusting a distance between the top grinder and the bottom grinder in response to rotation of the top grinder.

14. The method of claim 13, wherein the molding act forms a mechanical transmission member molded with the plastic material forming said support.

15. The grinding member according to claim 1, wherein said top grinder and said plastic material are intimately connected by shape coupling.

16. The grinding member according to claim 2, wherein said top grinder is made of ceramic material.

17. The grinding member according to claim 3, wherein said top grinder is made of ceramic material.

18. The grinding member according to claim 2, wherein said top grinder is made of metal.

19. The grinding member according to claim 2, wherein said top grinder has a plurality of anchoring projections embedded in the plastic material of said support.

20. The grinding member according to claim 3, wherein said top grinder has a plurality of anchoring projections embedded in the plastic material of said support.

21. The grinding member according to claim 2, wherein said top grinder comprises anchoring undercuts to which said plastic material forming the support adheres intimately.

22. The grinding member according to claim 3, wherein said top grinder comprises anchoring undercuts to which said plastic material forming the support adheres intimately.

23. The method of claim 13, wherein the positioning act includes the acts of:
   inserting the top grinder in the die; and
   closing the die.

24. The method of claim 23, wherein the molding act includes the acts of:
   melting the plastic material;
   injecting the molten plastic material into the closed die; and
   solidifying the injected plastic material to form the support that laterally embraces the rear surface and the side surface the top grinder.

25. The grinding member according to claim 1, wherein said gear toothing is formed on a flange and is substantially co-axial to said top grinder.

26. The grinding member of claim 1, wherein the top grinder comprises a flange extending from a periphery of the top grinder to effectuate the rotation of the top grinder for adjusting the distance between the top grinder and the bottom grinder.

* * * * *